United States Patent
Wei et al.

(10) Patent No.: US 7,973,763 B2
(45) Date of Patent: Jul. 5, 2011

(54) ELECTRONIC DEVICES WITH SENSIBLE ORIENTATION STRUCTURES, AND ASSOCIATED METHODS

(75) Inventors: Chang Hua Wei, Taoyuan (TW);
Francois Bellet-Odent, Taoyuan (TW);
Chien Hsin Huang, Taoyuan (TW);
Hsiao Chuan Huang, Taoyuan (TW);
Chih Ling Chien, Taoyuan (TW)

(73) Assignee: HTC Corporation, Taoyuan (TW)

( * ) Notice: Subject to any disclaimer, the term of this patent is extended or adjusted under 35 U.S.C. 154(b) by 898 days.

(21) Appl. No.: 11/735,407

(22) Filed: Apr. 13, 2007

(65) Prior Publication Data
US 2008/0254838 A1    Oct. 16, 2008

(51) Int. Cl.
*G09G 5/00* (2006.01)
(52) U.S. Cl. ............. 345/156; 345/8; 345/169; 345/173
(58) Field of Classification Search .............. 345/8, 31, 345/156, 158, 169, 173, 179, 619, 649, 652, 345/174; 178/18.01, 18.05; 455/90.1, 575.1, 455/566, 564, 550.1
See application file for complete search history.

(56) References Cited

U.S. PATENT DOCUMENTS

| | | | | |
|---|---|---|---|---|
| 3,617,016 A | * | 11/1971 | Bolsey | 244/3.16 |
| 4,119,809 A | | 10/1978 | Bianchini | |
| 6,046,730 A | * | 4/2000 | Bowen et al. | 345/168 |
| 6,096,984 A | * | 8/2000 | Howell et al. | 178/18.01 |
| 7,006,074 B2 | * | 2/2006 | Chesters | 345/156 |
| 7,444,163 B2 | * | 10/2008 | Ban et al. | 455/550.1 |
| 7,570,275 B2 | * | 8/2009 | Idesawa et al. | 345/684 |
| 7,728,845 B2 | * | 6/2010 | Holub | 345/589 |
| 7,825,895 B2 | * | 11/2010 | Bynum et al. | 345/156 |
| 2003/0080947 A1 | | 5/2003 | Genest et al. | |
| 2005/0124393 A1 | * | 6/2005 | Nuovo et al. | 455/575.1 |
| 2005/0143124 A1 | * | 6/2005 | Kennedy et al. | 455/556.1 |
| 2006/0028442 A1 | * | 2/2006 | Bynum et al. | 345/157 |
| 2006/0061545 A1 | * | 3/2006 | Hughes et al. | 345/156 |
| 2006/0084393 A1 | * | 4/2006 | Engstrom et al. | 455/90.1 |
| 2006/0092133 A1 | * | 5/2006 | Touma et al. | 345/158 |
| 2006/0217231 A1 | * | 9/2006 | Parks et al. | 482/3 |
| 2006/0280294 A1 | | 12/2006 | Zhang | |
| 2007/0021152 A1 | * | 1/2007 | Jung | 455/564 |

(Continued)

FOREIGN PATENT DOCUMENTS
CN    2872460 Y    2/2007
(Continued)

OTHER PUBLICATIONS

European Search Report for European Application No. 07254485; Applicant: High Tech Computer Corp.; Date of Mailing: Feb. 18, 2009, 8 pages.

*Primary Examiner* — Prabodh M Dharia
(74) *Attorney, Agent, or Firm* — Perkins Coie LLP

(57) ABSTRACT

An electronic device includes a faceplate having a faceplate surface and a display at or near the faceplate surface for providing content to a user. The electronic devices can also include an input device proximate to the display for accepting input from the user. The electronic devices can further include a sensible orientation structure carried by the faceplate and at a fixed relative position relative to the input device. The sensible orientation structure is configured to provide the user with positional feedback relative to the input device via touching.

37 Claims, 11 Drawing Sheets

U.S. PATENT DOCUMENTS

| | | | |
|---|---|---|---|
| 2007/0247439 A1* | 10/2007 | Daniel et al. | 345/173 |
| 2007/0296702 A1* | 12/2007 | Strawn et al. | 345/169 |
| 2008/0015717 A1* | 1/2008 | Griffin et al. | 700/94 |
| 2008/0100572 A1* | 5/2008 | Boillot | 345/158 |
| 2008/0136792 A1* | 6/2008 | Peng et al. | 345/174 |
| 2008/0196945 A1* | 8/2008 | Konstas | 178/18.03 |
| 2008/0246723 A1* | 10/2008 | Baumbach | 345/156 |
| 2009/0273588 A1* | 11/2009 | King et al. | 345/179 |

FOREIGN PATENT DOCUMENTS

| | | |
|---|---|---|
| JP | 01-133123 | 5/1989 |
| JP | 6036642 A | 2/1994 |
| JP | 2000-047794 | 2/2000 |
| JP | 2001-273075 | 10/2001 |
| JP | 2006-245898 | 9/2006 |

\* cited by examiner

ELECTRONIC DEVICES WITH SENSIBLE ORIENTATION STRUCTURES, AND ASSOCIATED METHODS

TECHNICAL FIELD

The present disclosure relates to electronic devices having sensible orientation structures. In particular, aspects of the present disclosure relate to mobile communication and/or computing devices having sensible orientation structures.

BACKGROUND

Current mobile communication/computing devices typically include a display for outputting information to a user and a keyboard/keypad for collecting responses from the user. One drawback associated with the current mobile communication/computing devices is that the user's attention must be diverted from the display when operating the keyboard/keypad to input responses. As a result, the user typically has to repeatedly switch focus between the display and the keyboard/keypad. Such repetition can detract from the overall experience and satisfaction of operating the mobile communication/computing devices. Accordingly, there is a need to improve the overall usability of the mobile communication/computing devices.

DETAILED DESCRIPTION

A. Overview

The present disclosure describes sensible orientation structures for electronic devices and associated methods. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the invention. Additionally, the invention can include other embodiments that are within the scope of the claims but are not described in detail with respect to FIGS. 1-6.

B. Electronic Devices with Sensible Orientation Structures

Figure 1A:
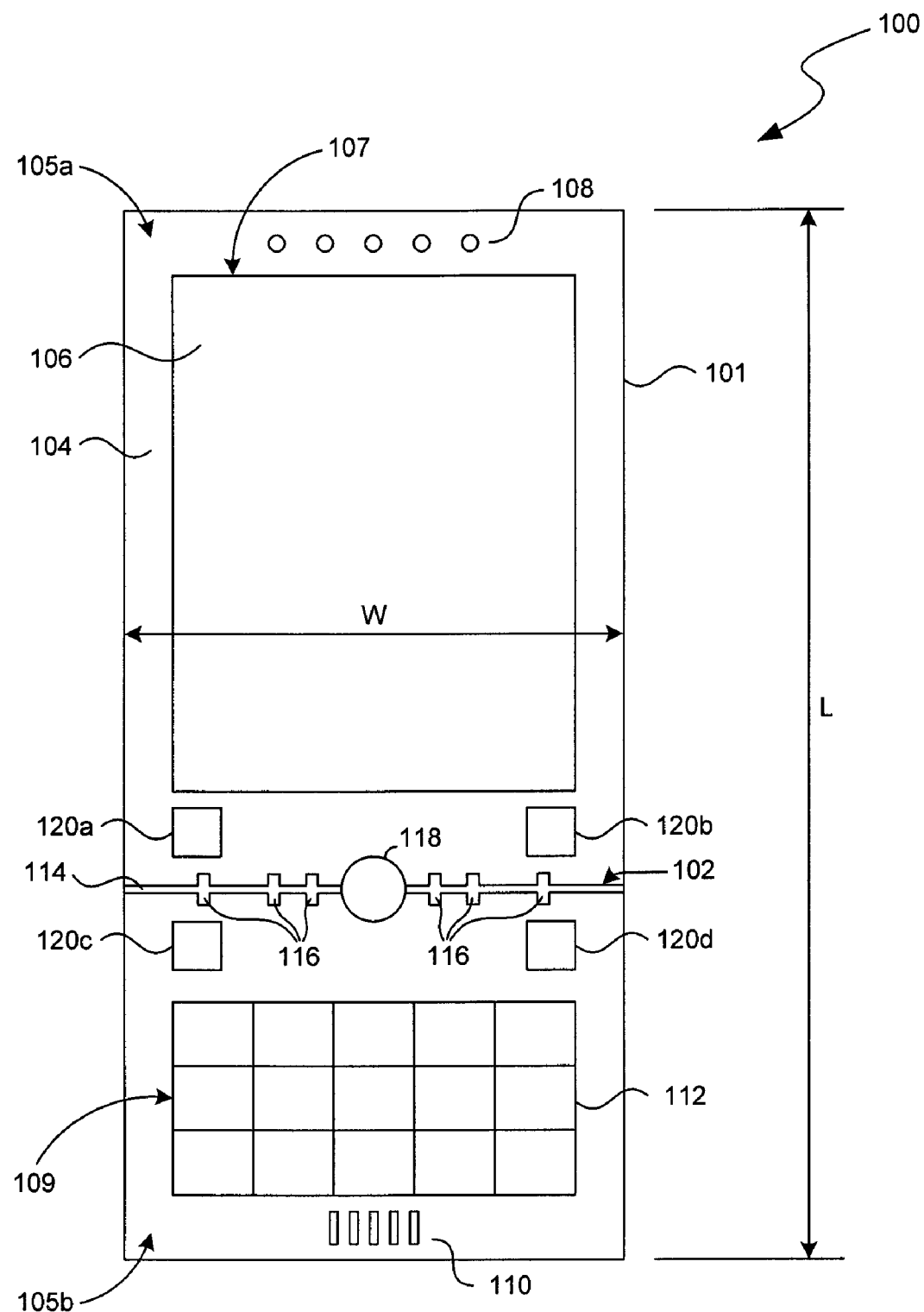
FIG. 1A is a front view of an electronic device having a sensible orientation structure and configured in accordance with an embodiment of the invention.

FIG. 1A is a front view of an electronic device 100 having a sensible orientation structure and configured in accordance with an embodiment of the invention. The electronic device 100 can include a housing 101 and various electronic and/or mechanical components carried by or attached to the housing 101. For example, the electronic device 100 can include various computing components (not shown) positioned in and/or on the housing 101. The computing components can be those generally found in PDA devices, cellular phones, laptop computers, tablet PCs, smart phones, hand-held email devices, or other mobile communication/computing devices. In one embodiment, the electronic device 100 can be an e-mail device or used for transmitting/receiving e-mail.

The electronic device 100 can also include a faceplate 104 having a first end 105a and a second end 105b, a first opening 107 for receiving a display 106 (e.g., a liquid crystal display), a receiver 108 proximate to the first end 105a, a microphone 110, and a second opening 109 for receiving a keyboard (or dialing keypad) 112 proximate to the second end 105b, and/or other types of electronic and/or mechanical components. The faceplate 104 can have a generally plate-like shape with a length L and a width W. The keyboard 112 can include a QWERTY keyboard, a QWERTZ keyboard, an AZERTY keyboard, a DVORAK keyboard, a touch pad, a handwriting tablet, and/or other types of input devices.

The electronic device 100 can also include a sensible orientation structure 102 positioned on or at least partially embedded in the faceplate 104. The sensible orientation structure 102 can include a main element 114, a plurality of optional guiding elements 116, and an optional input element 118 proximate to the main element 114. The main element 114 can include an indentation and/or a protrusion in the faceplate 104. In the illustrated embodiment, the main element 114 includes an indentation that has a generally straight-line configuration. The main element 114 traverses the entire width W of the faceplate 104. In other embodiments, the main element 114 can traverse only a portion of the width W. In further embodiments, the sensible orientation structure 102 can have other configurations, as described in more detail below with reference to FIGS. 2A-6.

In any of these embodiments, the main element 114 can be configured to generally correspond to a user's finger. For example, the main element 114 can include an indentation sized and shaped to accept at least a portion of the user's finger. The main element 114 can also include curves, steps, and/or other transition features to accommodate the user's finger as it moves across or along the main element 114.

The guiding elements 116 can generally straddle the main element 114. Individual guiding elements 116 can include an indentation and/or a protrusion different than those of the main element 114 for indicating a position transversely along the main element 114. In the illustrated embodiment, the guiding elements 116 are spaced non-evenly. For example, the distance between two adjacent guiding elements 116 can increase or decrease toward the input element 118. In other embodiments, the guiding elements 116 can be spaced generally evenly. In further embodiments, a portion of the guiding elements 116 can be spaced generally evenly, and another portion can be spaced generally non-evenly.

The input element 118 can include a scroll wheel (e.g., a trackball, a jog wheel, etc.), a directional keypad (e.g., a five-way key), a push button, a biometric reader, and/or other types of input devices. In the illustrated embodiment, the input element 118 has a generally circular shape and is positioned generally in the center of the main element 114. In other embodiments, the input element 118 can have other shapes and be positioned in other locations along or spaced apart from the main element 114. In further embodiments, the input element 118 can be omitted.

Optionally, the electronic device 100 can further include a plurality of input devices 120 (identified individually as 120a-d) positioned proximate to the sensible orientation structure 102. The input devices 120 can include mechanical and/or electrical buttons, touch pads, and/or other types of suitable input mechanisms. The input devices 120 can be grouped into subsets that have different functions. For example, the first and second input devices 120a-b can be configured as "soft" keys that correspond to the current content on the display 106. The third and fourth input devices 120c-d can be configured to have dedicated functions (e.g., power on, dialing, etc.) irrespective of the current content on the display 106. Even though four input devices 120 are shown in FIG. 1A, in other embodiments, the electronic device 100 can include any number of input devices 120, or the input devices 120 can be omitted.

Figure 1B:
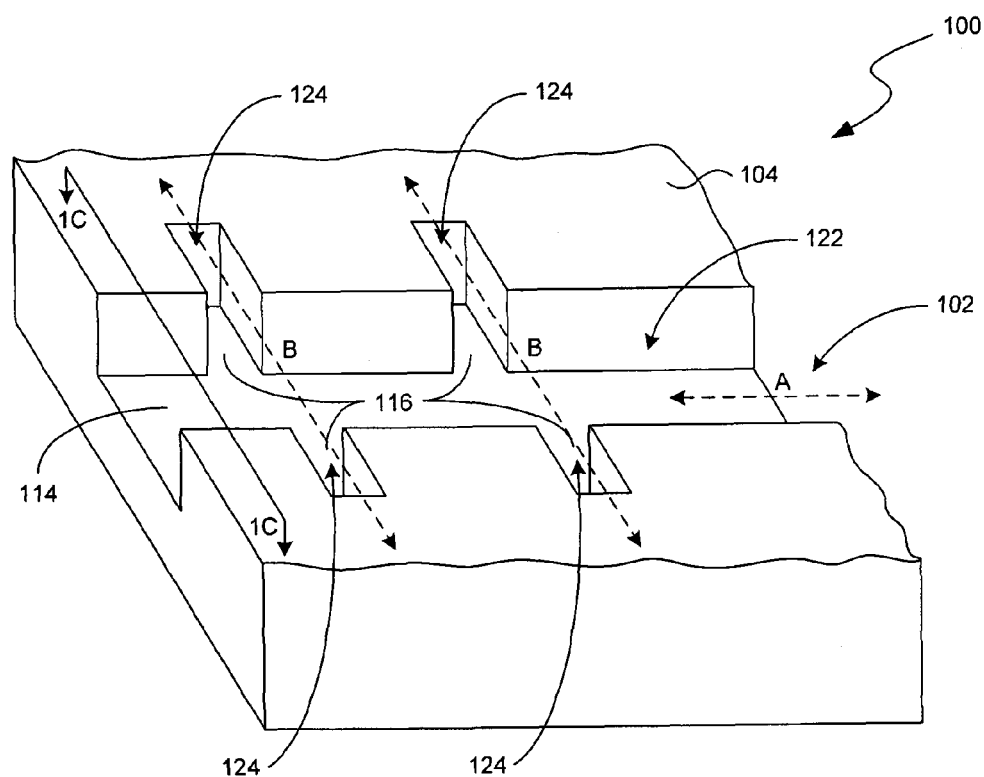
FIG. 1B is an enlarged and partially cut-away perspective view of the electronic device in FIG. 1A.

FIG. 1B is an enlarged and partially cut-away perspective view of a portion of the electronic device 100 of FIG. 1A. In the illustrated embodiment, the main element 114 of the sensible orientation structure 102 includes a first indentation 122 in the faceplate 104. The first indentation 122 has a generally rectangular cross section and extends transversely across the faceplate 104 along a first axis A. The guiding elements 116 include a plurality of second indentations 124 in the faceplate 104. Individual second indentations 124 have a generally rectangular cross section and extend away from the first indentation 122 along a second axis B that is generally normal to the first axis A. The second indentations 124 can have a depth that is generally similar to that of the first indentation 122. The first and second indentations 122, 124 can be formed by milling, etching, drilling, and/or other suitable mechanisms. In other embodiments, the main element 114 and the guiding elements 116 can have other configurations. For example, the guiding elements 116 can extend along a direction canted relative to the first axis A. The guiding elements 116 can also have a depth that is different from the first indentation 122. In some embodiments, the guiding elements 116 can include protrusions on the faceplate 104 instead of indentations.

Figure 1C:
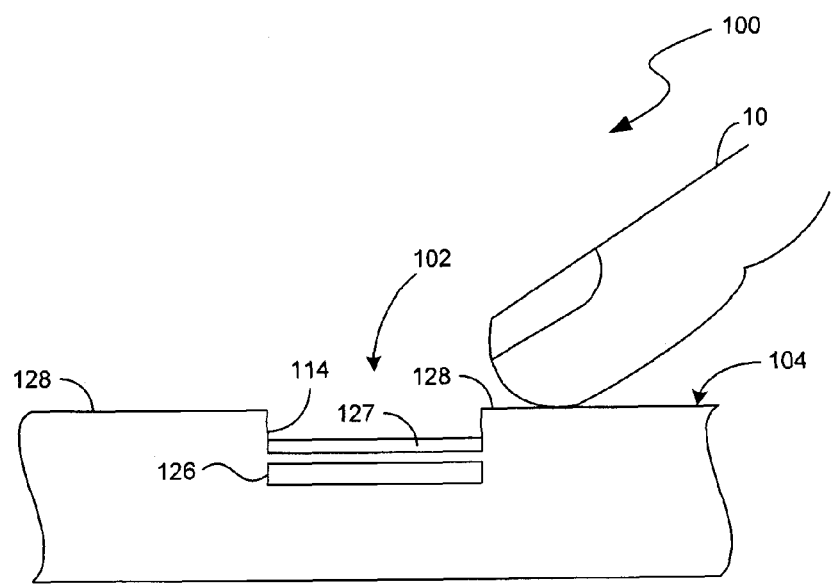
FIG. 1C is an enlarged and partially cut-away cross-section view of the electronic device of FIG. 1A.
Figure 1D:
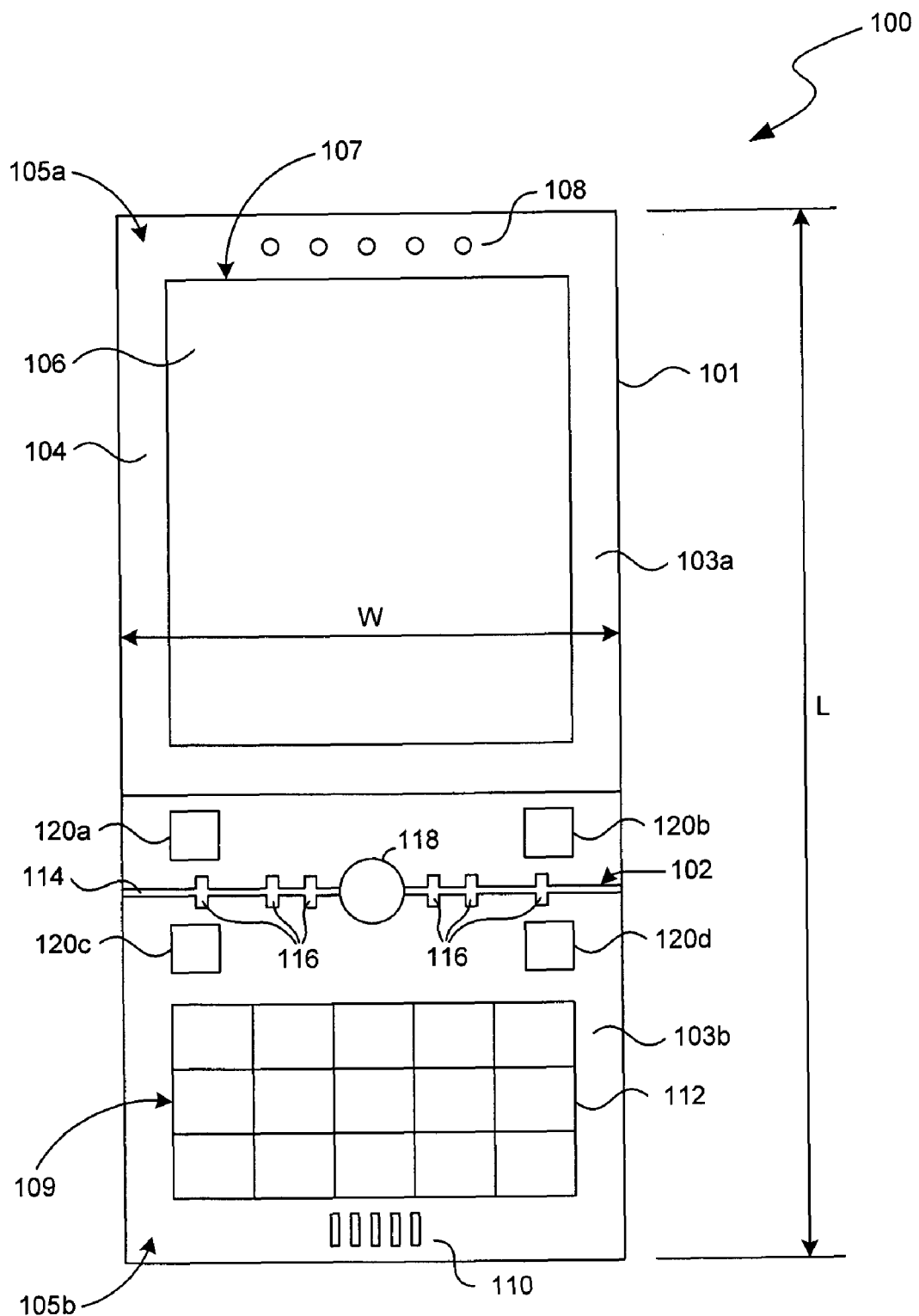
FIG. 1D is a front view of an electronic device having a sensible orientation structure and configured in accordance with another embodiment of the invention.
Figure 1E:
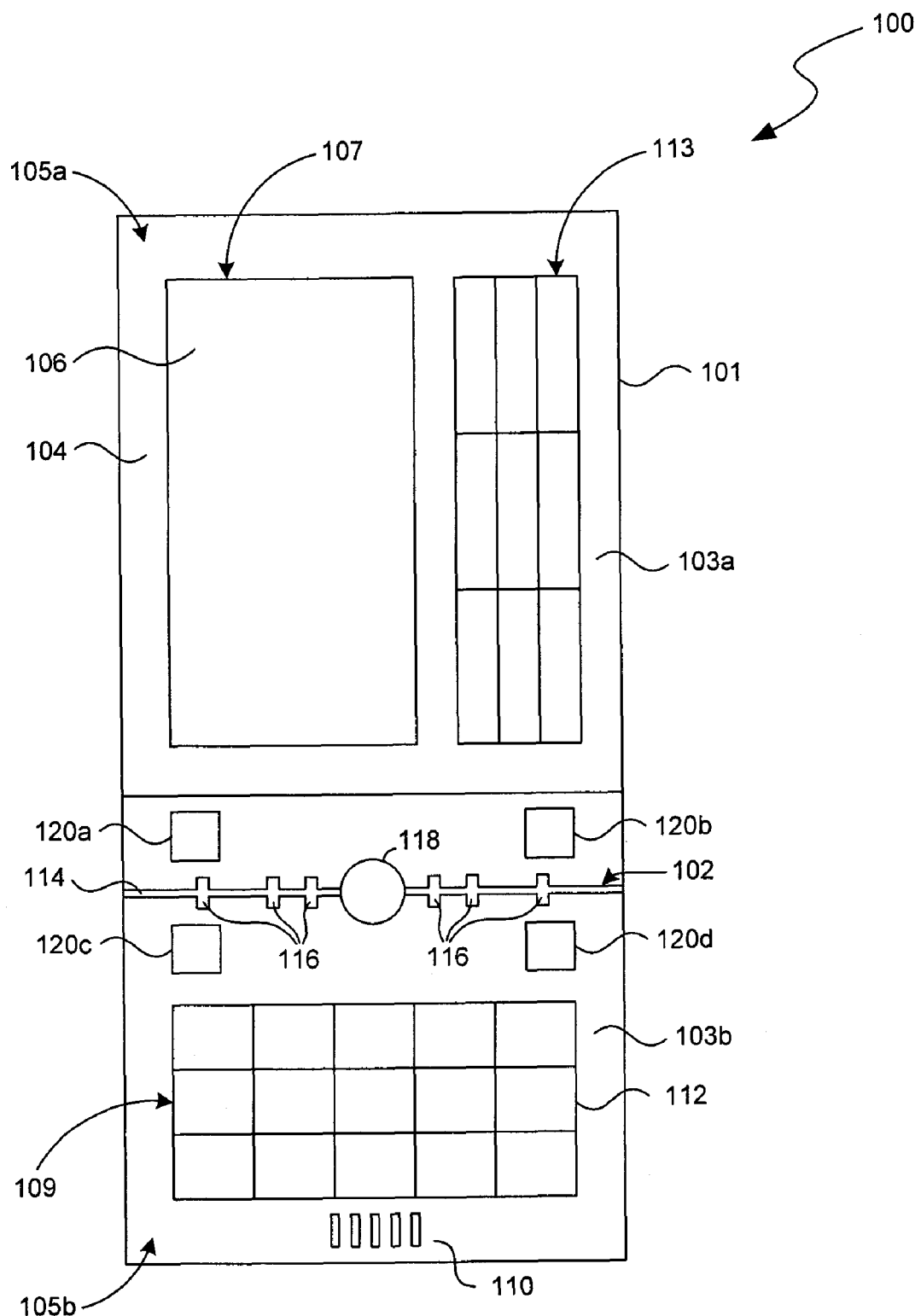
FIG. 1E is a front view of an electronic device having a sensible orientation structure and configured in accordance with a further embodiment of the invention.

FIG. 1C is an enlarged and partially cut-away cross-section view of the electronic device 100 of FIG. 1. In the illustrated embodiment, the faceplate 104 has a generally flat faceplate surface 128, and the sensible orientation structure 102 forms a discontinuity in the faceplate surface 128. The electronic device 100 also includes a light source 126 positioned beneath the faceplate 104 and proximate to the sensible orientation structure 102 and an optional transparent portion 127 at the sensible orientation structure 102. The light source 126 can include at least a light emitting diode, an incandescent light bulb, and/or other illuminating devices. The transparent portion 127 can include a strip or a film constructed from plastic, rubber, or other suitable transparent material. In operation, the light source 126 can illuminate the sensible orientation structure 102 through the transparent portion 127. In other embodiments, the light source 126 and/or the transparent portion 127 can be omitted.

Referring to FIGS. 1A-C together, the sensible orientation structure 102 can guide a user to desired input devices 120 and/or the keyboard 112 via touching and without the user looking at these components. In operation, the user can move his/her finger 10 across the faceplate 104 (e.g., longitudinally, transversely, or a combination thereof. The user can then detect the sensible orientation structure 102 by recognizing the discontinuity in the faceplate surface 128. The sensible orientation structure 102 can then provide the user with a longitudinal position of the finger 10 relative to the input devices 120 and/or the keyboard 112 based on the position of the sensible orientation structure 102 relative to these components. In certain embodiments, the user can also identify a transversal position of the finger 10 by recognizing the optional guiding elements 116. The user can then move the finger 10 toward a desired input device 120 and/or a key of the keyboard 112 based the identified relative positions. Throughout this process, the user can operate the electronic device 100 without looking at the input devices 120 and/or the keyboard 112.

The sensible orientation structure 102 can improve the user experience of operating the electronic device 100. The sensible orientation structure 102 can help the user to intuitively operate the electronic device 100 without diverting his/her attention from the display 106 to the input devices 120 and/or the keyboard 112.

The sensible orientation structure 102 can help to reduce inadvertent selection and/or actuation of input devices. Conventional electronic devices are typically prone to inadvertent selection and/or actuation because of closely located input keys. The sensible orientation structure 102 can separate and/or otherwise identify input devices with different control functions such that the risk of inadvertent selection and/or actuation is reduced.

The sensible orientation structure 102 can improve mapping of the input devices 120. Such mapping can indicate to the user the general function of a particular input device. For example, input devices configured as soft keys can be positioned on one side, and other input devices configured to have dedicated functions can be positioned on the other side of the sensible orientation structure 102.

Even though the electronic device 100 is illustrated in FIG. 1 as a unitary piece, in other embodiments, the electronic device 100 can have at least two portions coupled together with a hinge, a track, or other interconnecting mechanisms. For example, FIG. 1D illustrates an embodiment of the electronic device 100 configured as a pivotable and/or slidable device. The electronic device 100 has the receiver 108 and the display 106 at a first portion 103a, and the keyboard 112 at a second portion 103b of the electronic device 100. The first and second portions 103a-b can pivot and/or slide relative to each other. For example, when the electronic device 100 is closed, the first and second portions 103a-b can generally overlap with each other. When the electronic device 100 is open, the first and second portions 103a-b can be offset from and/or canted relative to each other. In some embodiments, the sensible orientation structure 102 can be positioned in other locations of the faceplate 104. For example, the sensible orientation structure 102 can be positioned in the first portion 103a or in the second portion 103b and proximate to the second end 105b of the faceplate 104. In further embodiments, the keyboard 112 can be omitted, and the electronic device 100 can include a "soft" keyboard that is accessible via the display 106. In further embodiment, the first portion 103a can further include a dialing keypad 113 positioned on the first portion of the electronic device 100, as illustrated in FIG. 1E.

C. Embodiments of Sensible Orientation Structures

Figure 2A:
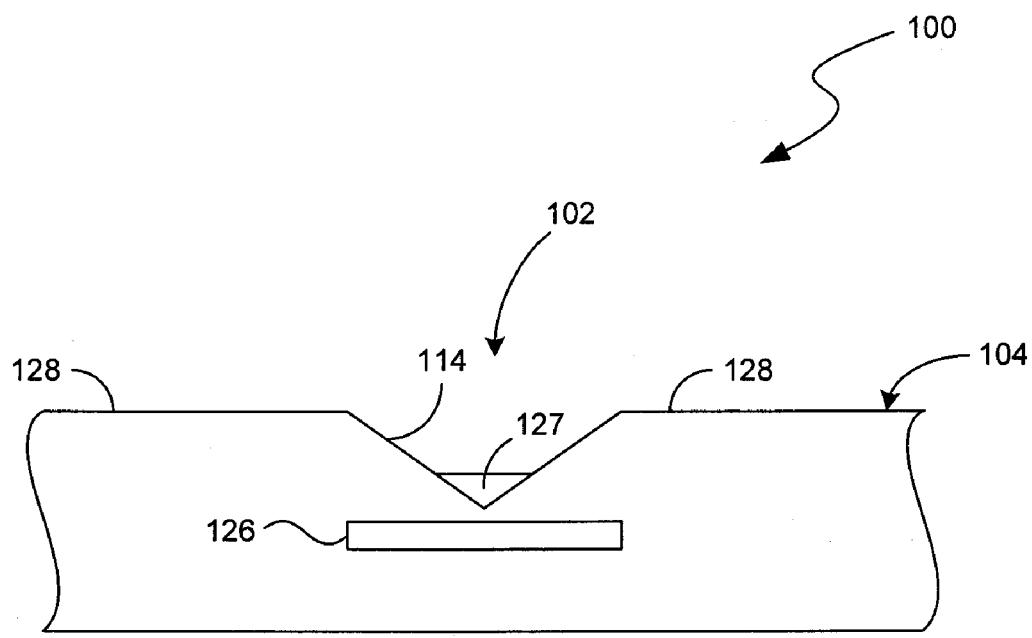
FIGS. 2A-I are enlarged and partially cut-away cross-section views of several embodiments of a sensible orientation structure suitable for use in the electronic device of FIG. 1.
Figure 2B:
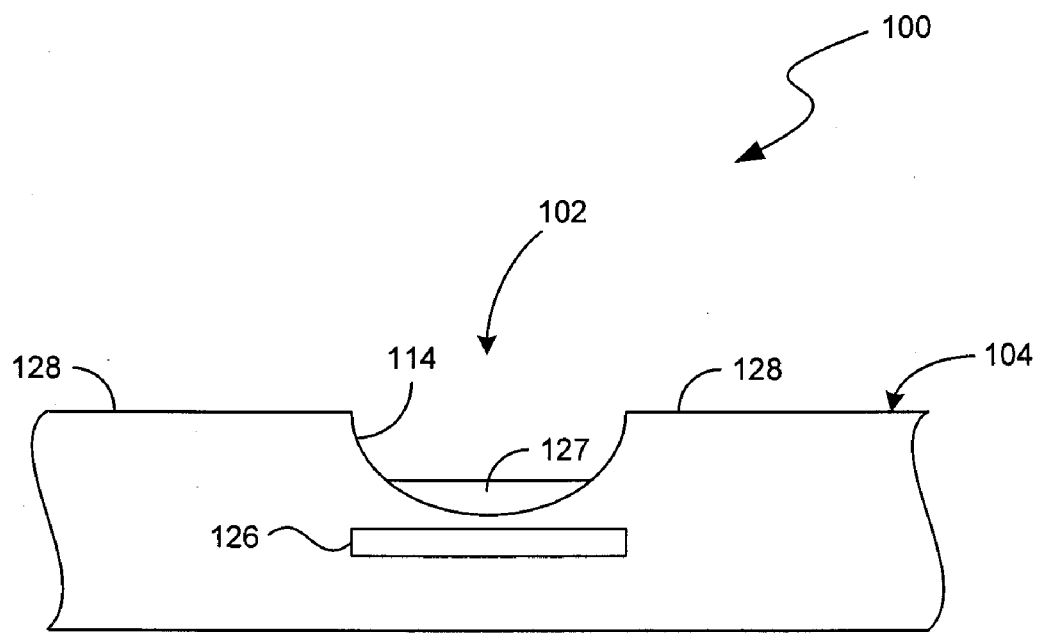

FIGS. 2A-I are enlarged and partially cut-away cross-section views of several additional embodiments of the sensible orientation structure 102 of FIG. 1. The sensible orientation structure 102 can have a main element 114 with any desired cross-sectional configurations. For example, the main element 114 can have a triangular cross section, as shown in FIG. 2A, a curved cross section (e.g., semicircular, oval, parabolic, etc.), as shown in FIG. 2B, or any other cross-sectional configuration for a particular application.

Figure 2C:
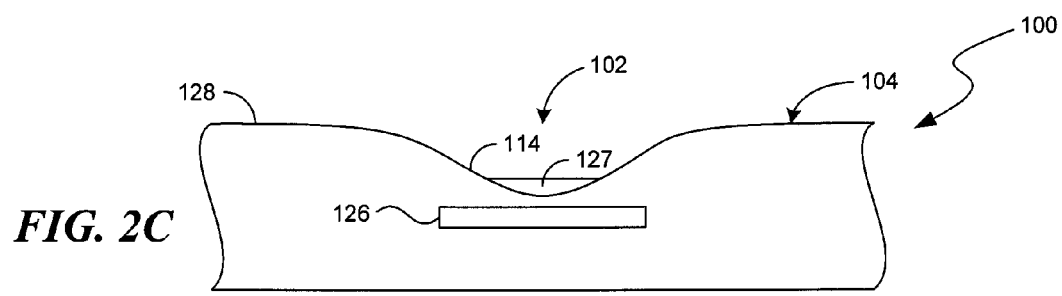
Figure 2D:
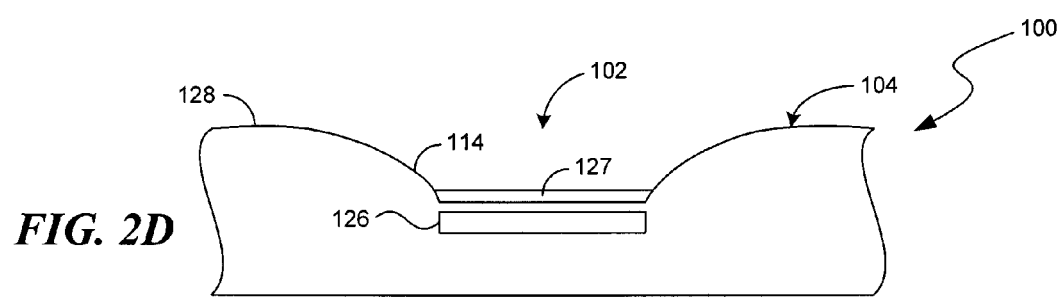
Figure 2E:
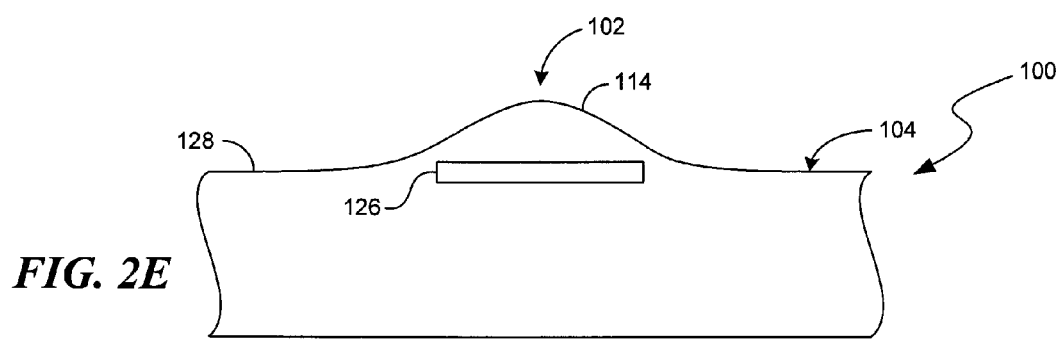
Figure 2F:
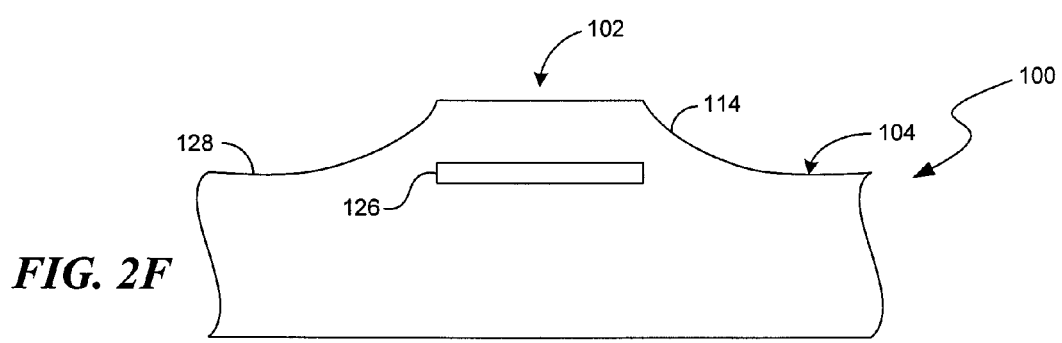

In the embodiments illustrated in FIGS. 2A-B, the faceplate 104 has a generally flat faceplate surface 128 proximate to the sensible orientation structure 102. In other embodiments, the faceplate 104 can have a curved faceplate surface 128 proximate to the sensible orientation structure 102. For example, the faceplate surface 128 and the main element 114 of the sensible orientation structure 102 can form a generally concave shape having a curved bottom, as shown in FIG. 2C, or a flat bottom, as shown in FIG. 2D. The faceplate surface 128 and the main element 114 can also form a generally convex shape having a curved top, as shown in FIG. 2E, or a flat top, as shown in FIG. 2F.

The electronic device 100 having a curved faceplate surface 128 can provide a user with additional positional feedback. For example, the faceplate surface 128 can have a gradually changing curvature longitudinally and/or transversely toward the main element 114. In operation, as the user moves his/her finger across the faceplate 104, the curvature of the faceplate 104 can indicate to the user the closeness of his/her finger to a certain position (e.g., the main element 114). Another expected advantage is that the curved faceplate surface 128 can increase the useful surface area of the faceplate 104. As a result, additional control and/or other navigational features can be positioned on the faceplate 104.

Figure 2G:
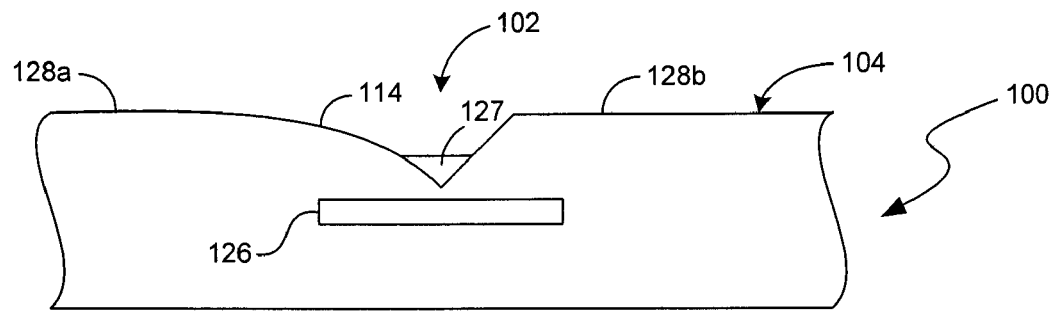
Figure 2H:
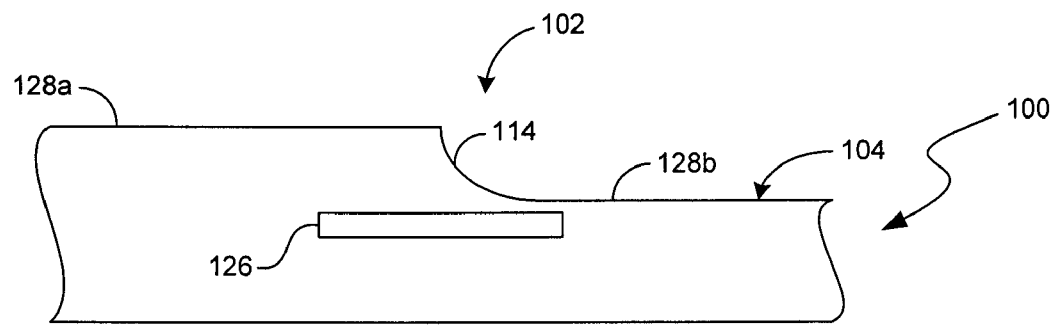
Figure 2I:
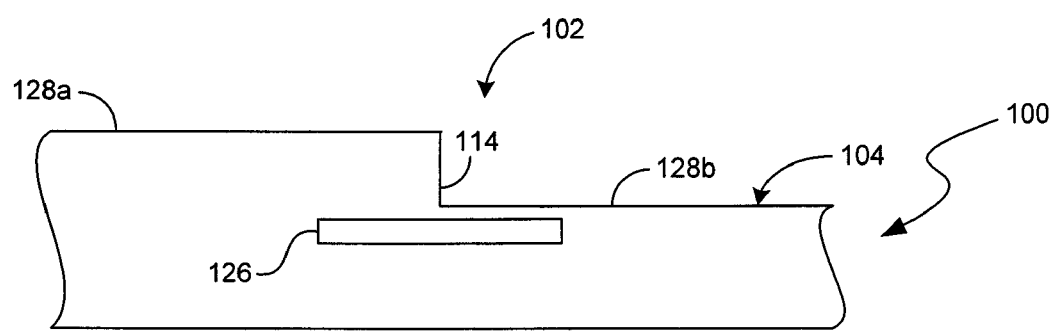

In any of the embodiments illustrated in FIGS. 2A-F, the faceplate surface 128 has a generally symmetrical configuration with respect to the sensible orientation structure 102. In other embodiments, the faceplate surface 128 can be asymmetrical with respect to the sensible orientation structure 102. For example, the sensible orientation structure 102 can separate the faceplate surface 128 into a first surface portion 128a and a second surface portion 128b. In one embodiment, the first surface portion 128a can be curved, and the second surface portion 128b can be generally flat, as shown in FIG. 2G. In another embodiment, the first surface portion 128a can be generally flat, and the second surface portion 128b can be curved, as shown in FIG. 2H. In a further embodiment, both the first and second surface portions 128a-b can be generally flat but offset from each other, as shown in FIG. 2I.

C. Additional Embodiments of Sensible Orientation Structures

FIGS. 3-6 illustrate additional embodiments of the electronic device 100 of FIGS. 1A-C. In these embodiments, several components of the electronic device shown in FIGS. 3-6 are at least generally similar to the corresponding components of the electronic device 100 described above with reference to FIGS. 1A-C. Accordingly, selected differences in the operation and structure of the electronic device 100 shown in FIGS. 3-6 are described below. Like reference symbols generally refer to like features and components in FIGS. 1-6.

Figure 3:
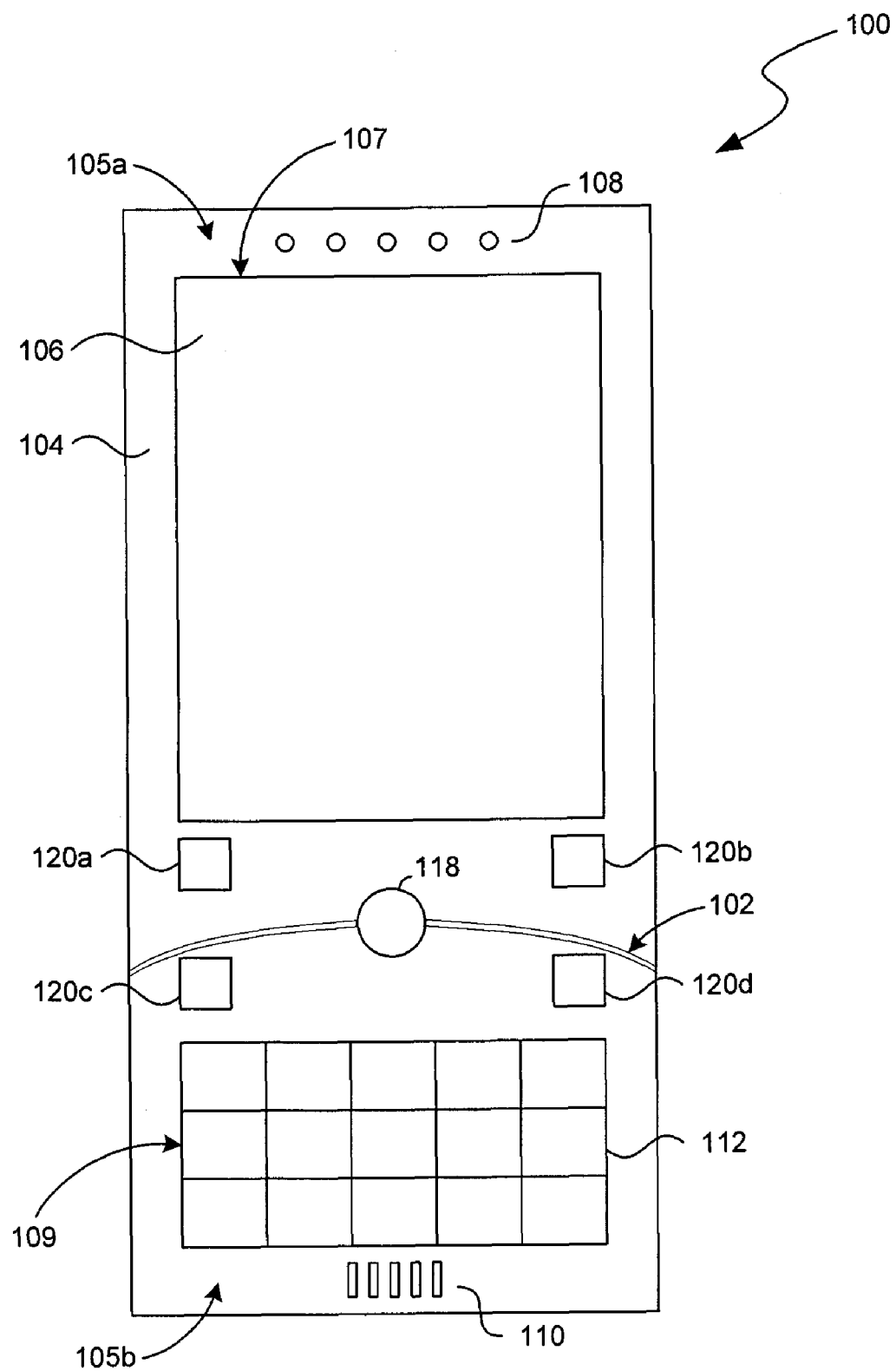
FIG. 3 is a front view of an electronic device having a concave sensible orientation structure and configured in accordance with another embodiment of the invention.
Figure 4:
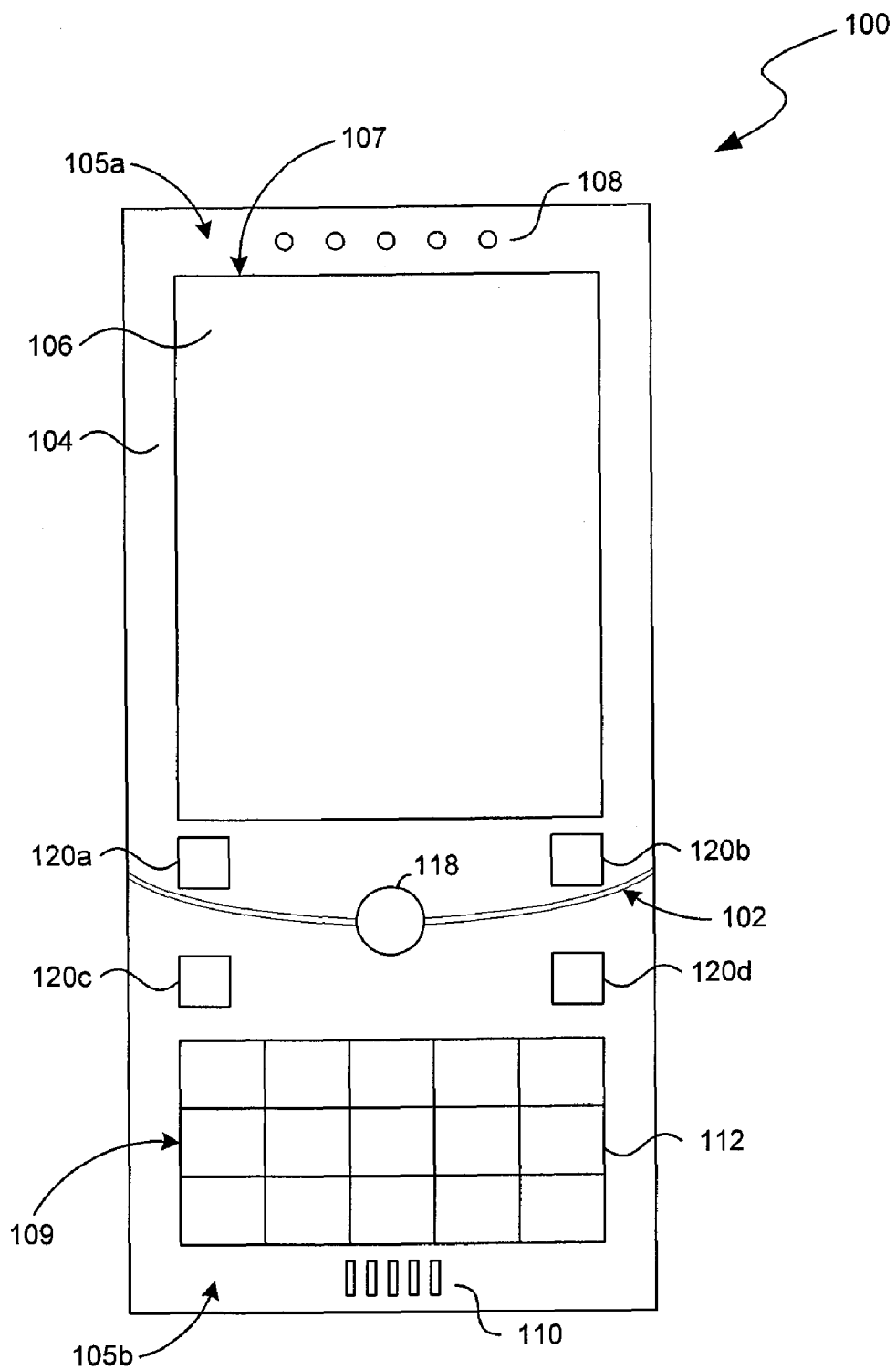
FIG. 4 is a front view of an electronic device having a convex sensible orientation structure and configured in accordance with another embodiment of the invention.
Figure 5:
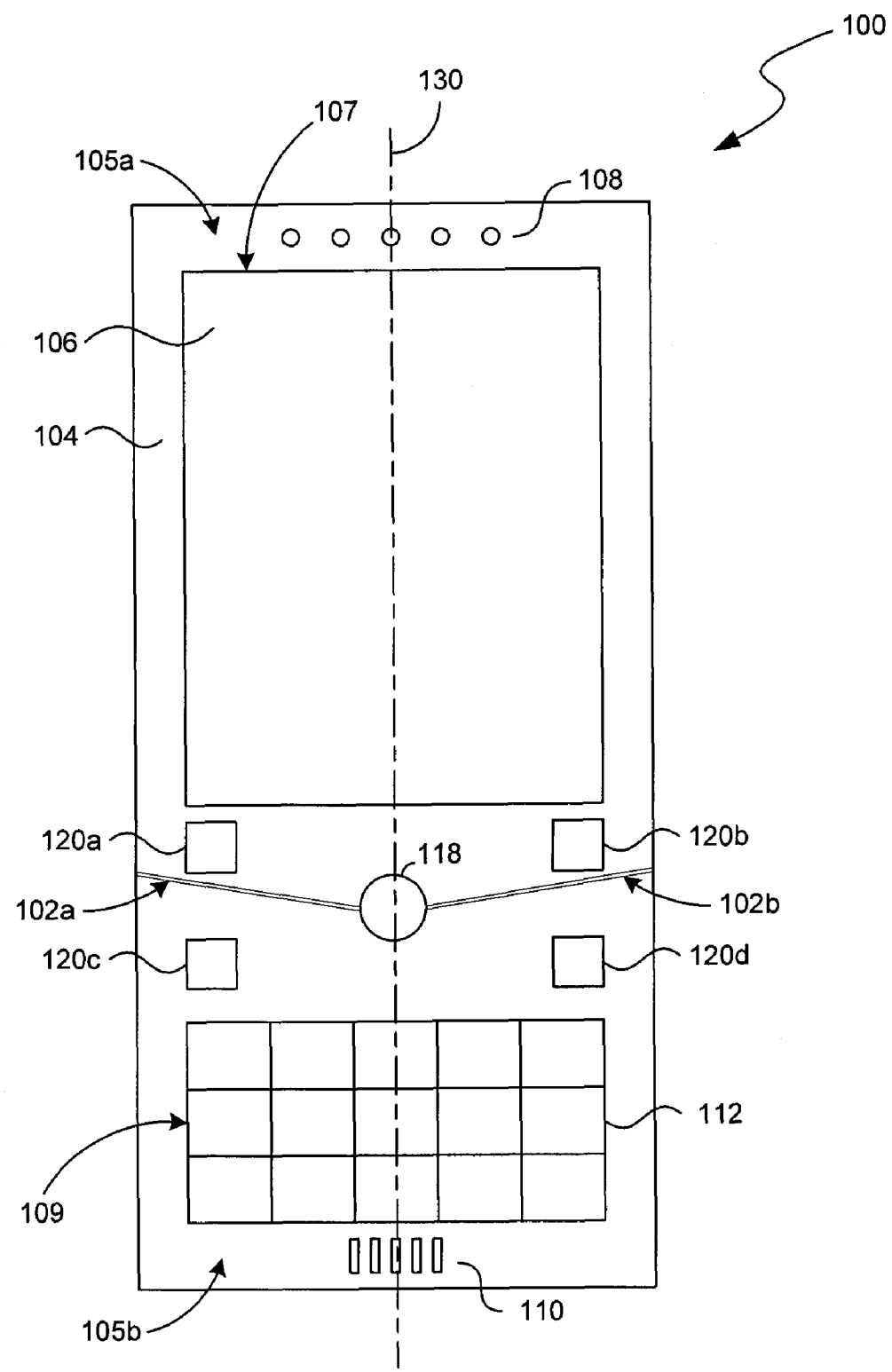
FIG. 5 is a front view of an electronic device having an angled sensible orientation structure and configured in accordance with another embodiment of the invention.
Figure 6:
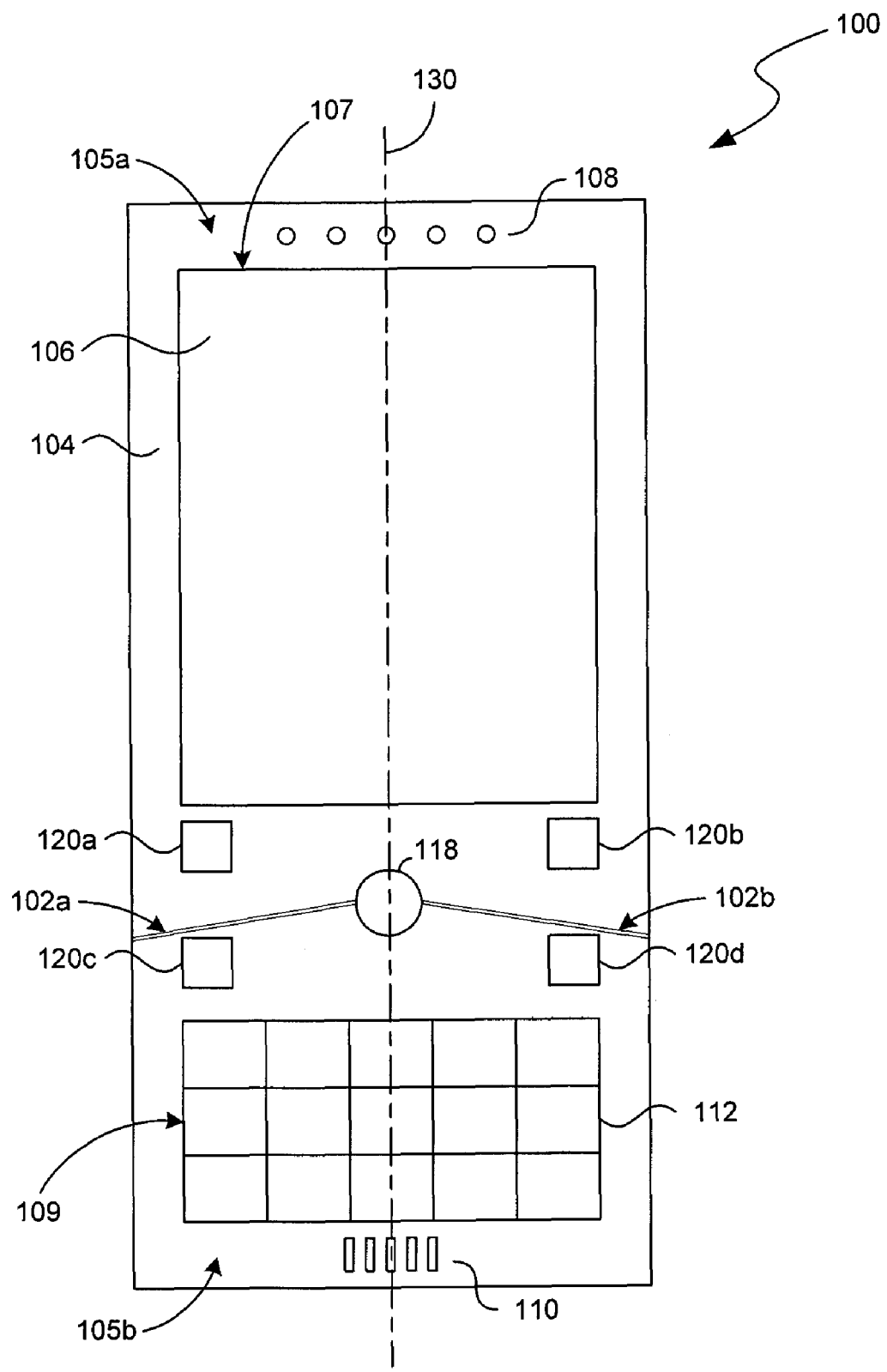
FIG. 6 is a front view of an electronic device having an angled sensible orientation structure and configured in accordance with a further embodiment of the invention.

As illustrated in FIGS. 3-6, the sensible orientation structure 102 can have different transverse configurations relative to the faceplate 104. In one embodiment, the sensible orientation structure 102 can form a generally concave curve transversely across the faceplate 104, as shown in FIG. 3. In another embodiment, the sensible orientation structure 102 can form a generally convex curve, as shown in FIG. 4. The sensible orientation structure 102 can also be divided into a first structure portion 102a and a second structure portion 102b along a center line 130 and/or the optional input element 118. As shown in FIG. 5 and FIG. 6, in some embodiments, individual first and second structure portions 102a-b can form a generally straight line and are canted relative to each other.

From the foregoing, it will be appreciated that specific embodiments of the invention have been described herein for purposes of illustration, but that various modifications may be made without deviating from the invention. For example, the sensible orientation structure 102 can have a varying width transversely with respect to the faceplate 104. The electronic devices can include more than one sensible orientation structure. The electronic devices can also include additional components attached to the housing 101, such as a reserve battery compartment, a radio receiver, and a transmitter. Certain aspects of the invention described in the context of particular embodiments may be combined or eliminated in other embodiments. For example, various cross-sectional configurations of the sensible orientation structure 102 can be combined with different configurations of the faceplate 104 in certain embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A mobile communication device, comprising:
a faceplate having a faceplate surface;
a display at or near the faceplate surface for providing content to a user;
an input device proximate to the display for accepting input from the user; and
a sensible orientation structure carried by the faceplate and physically separate from the input device and positioned at a fixed relative position relative to the input device, the sensible orientation structure being configured to provide the user with positional feedback relative to the input device via touching.

2. The mobile communication device of claim 1 wherein the sensible orientation structure includes a main element configured to provide the user with longitudinal positional feedback relative to the input device.

3. The mobile communication device of claim 2 wherein the main element includes at least an indentation and/or a protrusion in the faceplate surface.

4. The mobile communication device of claim 2 wherein the main element includes a groove in the faceplate surface and is sized and shaped to accept at least a portion of a user's finger.

5. The mobile communication device of claim 2 wherein the main element includes a groove in the faceplate surface and a transparent portion positioned at the groove.

6. The mobile communication device of claim 5, further comprising a light source positioned beneath the faceplate for illuminating the sensible orientation structure through the transparent portion.

7. The mobile communication device of claim 2 wherein the main element includes a groove in the faceplate surface, and wherein the groove has a cross section that is rectangular, triangular, curved, or trapezoidal.

8. The mobile communication device of claim 2 wherein the main element has a generally straight-line shape, a concave shape, or a convex shape.

9. The mobile communication device of claim 2 wherein the sensible orientation structure further includes at least one guiding element positioned at or near the main element, the at least one guiding element being configured to provide the user with transversal positional feedback relative to the input device via touching.

10. The mobile communication device of claim 9 wherein the main element extends in a transversal direction at the faceplate, and wherein the at least one guiding element extends away from the main element in a longitudinal direction.

11. The mobile communication device of claim 9 wherein the main element and the at least one guiding element of the sensible orientation structure include indentations having the same depth.

12. The mobile communication device of claim 2 wherein the sensible orientation structure further includes a plurality of guiding elements positioned at or near the main element, a distance between two adjacent guiding elements varies along the main element.

13. The mobile communication device of claim 2 wherein the input device is a first input device, wherein the main element includes a groove in the faceplate surface, wherein the mobile communication device further includes a second input device positioned at least partially at the main element, and wherein the second input device is positioned generally in the center of the main element and includes a trackball, a jog wheel, a directional keypad, a push button, or a biometric reader.

14. The mobile communication device of claim 13 wherein the second input device divides the main element into a first portion and a second portion, and wherein the first and second portions are canted relative to each other.

15. The mobile communication device of claim 1 wherein the faceplate includes a first faceplate portion and a second faceplate portion, and wherein the display is positioned on the first faceplate portion and the mobile communication device further includes a keyboard positioned on the second faceplate portion.

16. The mobile communication device of claim 15 wherein the first faceplate portion is pivotably coupled to the second faceplate portion, and wherein the sensible orientation structure is positioned on the second faceplate portion and between the display and the keyboard selected from a group consisting of a QWERTY keyboard, a QWERTZ keyboard, an AZERTY keyboard, and a DVORAK keyboard.

17. The mobile communication device of claim 1, further comprising a dialing keypad positioned on the first faceplate portion, wherein the sensible orientation structure is between the display and the dialing keypad.

18. An electronic device, comprising:
a housing having a surface;
a display and an input device both carried by the housing, the display being proximate to the input device; and
a sensible orientation structure at a fixed position between the display and the input device and physically separate from the display and the input device, the sensible orientation structure having a discontinuity at the surface of the housing, wherein the discontinuity divides the surface into a first surface portion and a second surface portion.

19. The electronic device of claim 18 wherein the discontinuity includes an indentation or a protrusion in the surface of the housing, and wherein the discontinuity traverses generally the entire width of the surface.

20. The electronic device of claim 18 wherein at least one of the first and second surface portions is curved.

21. The electronic device of claim 18 wherein both the first and second surface portions are generally flat.

22. The electronic device of claim 18 wherein at least one of the first and second surface portions and the discontinuity form a generally continuous and curved surface.

23. The electronic device of claim 18 wherein at least one of the first and second surface portions has a concave or convex shape.

24. The electronic device of claim 18 wherein the first and second surface portions are generally symmetrical with respect to the sensible orientation structure.

25. The electronic device of claim 18 wherein the first and second surface portions are asymmetrical with respect to the sensible orientation structure.

26. The electronic device of claim 18 wherein the first and second surface portions are offset from each other.

27. The electronic device of claim 19 wherein the indentation includes a groove in the surface of the housing, and wherein the input device includes at least one key.

28. The electronic device of claim 18 wherein the input device is a first input device, and wherein the electronic device further includes a second input device spaced apart from the input device, the second input device being configured to have at least one dedicated function.

29. A method for operating an electronic device having a faceplate and a sensible orientation structure at the faceplate, comprising:
moving a finger across the faceplate;
detecting the sensible orientation structure at the faceplate;
identifying a position of the finger relative to an input device of the electronic device based on a position of the sensible orientation structure relative to the input device, wherein the input device is physically separate from the sensible orientation structure; and
moving the finger toward the input device based on the identified relative position.

30. The method of claim 29 wherein the sensible orientation structure includes a discontinuity in the faceplate, and wherein detecting the sensible orientation structure includes recognizing the discontinuity in the faceplate.

31. The method of claim 29 wherein the sensible orientation structure includes a discontinuity extending transversely across the faceplate, and wherein detecting the sensible orientation structure includes recognizing the discontinuity in the faceplate and providing the user with a longitudinal position of the finger.

32. The method of claim 29 wherein the sensible orientation structure further includes at least one guiding element positioned at or near the main element, and wherein the method further includes recognizing the at least one guiding element in the faceplate and providing the user with a transversal position of the finger.

33. The method of claim 29 wherein the faceplate has a curved faceplate surface, and wherein the method further includes detecting a curvature change in the faceplate and determining a position of the finger based on the detected curvature.

34. The method of claim 29, further comprising activating and/or selecting the input device with the finger.

35. The method of claim 29, further comprising illuminating the sensible orientation structure by activating a light source proximate to the sensible orientation structure.

36. A faceplate for a mobile communication device, comprising:
- a faceplate surface;
- a first faceplate portion for receiving a display;
- a second faceplate portion proximate to the first faceplate portion for receiving an input device configured for accepting input from the user; and
- a sensible orientation structure at the faceplate surface and positioned between the first and second faceplate portions, the sensible orientation structure being configured to provide the user with positional feedback relative to the input device via touching, wherein the sensible orientation structure is physically separate from the input device.

37. The faceplate of claim 36 wherein the sensible orientation structure includes a groove, and the faceplate further includes a transparent portion at the groove.

* * * * *